(12) United States Patent
Yeh et al.

(10) Patent No.: US 8,232,684 B2
(45) Date of Patent: Jul. 31, 2012

(54) METHOD AND SYSTEM FOR POWER LOAD MANAGEMENT

(75) Inventors: Tung-Jung Yeh, Miaoli (TW);
Sheng-Hsuan Peng, Jhudong Township, Hsinchu County (TW); Horng-Shinn Ko, Hsinchu (TW); Wen-Te Hung, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 88 days.

(21) Appl. No.: 12/204,973

(22) Filed: Sep. 5, 2008

(65) Prior Publication Data

US 2010/0026096 A1 Feb. 4, 2010

(30) Foreign Application Priority Data

Jul. 29, 2008 (TW) .............................. 97128678 A (51) Int. Cl.
*H01H 47/00* (2006.01)
(52) U.S. Cl. ........................... 307/126; 307/38; 700/276
(58) Field of Classification Search .................... 307/31, 307/34, 126, 38; 700/291, 295, 22, 276
See application file for complete search history.

(56) References Cited

U.S. PATENT DOCUMENTS

| | | | |
|---|---|---|---|
| 4,510,398 A | | 4/1985 | Culp et al. |
| 6,301,674 B1 * | | 10/2001 | Saito et al. .................... 713/340 |
| 6,493,643 B1 | | 12/2002 | Aisa |
| 7,035,693 B2 * | | 4/2006 | Cassiolato et al. ................ 700/1 |
| 7,136,725 B1 * | | 11/2006 | Paciorek et al. .............. 700/295 |
| 7,353,084 B2 * | | 4/2008 | Schaper et al. ............... 700/287 |
| 7,373,222 B1 * | | 5/2008 | Wright et al. ................ 700/295 |
| 2009/0062970 A1* | | 3/2009 | Forbes et al. ................ 700/295 |
| 2010/0204845 A1* | | 8/2010 | Ohuchi et al. ............... 700/291 |

FOREIGN PATENT DOCUMENTS

| | | |
|---|---|---|
| TW | 175182 | 12/1991 |
| TW | 472130 B | 1/2002 |
| TW | I272465 B | 2/2007 |
| TW | 200742819 | 11/2007 |
| TW | M329928 | 4/2008 |

OTHER PUBLICATIONS

TIPO Intellectual Property Office Ministry of Economic Affairs, R.O.C., "Office Action", Jul. 27, 2011, Taiwan.

* cited by examiner

*Primary Examiner* — Daniel Cavallari
(74) *Attorney, Agent, or Firm* — Morris Manning & Martin LLP; Tim Tingkang Xia, Esq.

(57) ABSTRACT

A method for power load management is provided in the present invention, wherein two different standard values are determined to be a basis for regulating power consumption. When power consumption exceeds a first standard value, a monitoring procedure is started to monitor consumption status. If the power consumption exceeds a second standard value, an unloading procedure is processed to reduce the power consumption of electrical devices under operation. In another embodiment, the present invention also provides a system for power load management comprising a control unit coupled to at least one electrical device and a power meter. By means of real-time recording of power consumption in the power meter, the control unit is capable of determining the power consumption status and determining whether it is necessary to unload or reload the at least one electrical device.

9 Claims, 7 Drawing Sheets

METHOD AND SYSTEM FOR POWER LOAD MANAGEMENT

BACKGROUND OF THE INVENTION

1. Field of the Invention

The present invention generally relates to a method and a system for power load management and, more particularly, to a method and a system for power load management capable of controlling the timing for unloading or reloading an electrical device according to power consumption thereof.

2. Description of the Prior Art

Due to the raise in oil and coal prices in recent years, the cost of generating power has significantly increased. Moreover, the green house effect worsens the global warming that ecologically affects the earth. Therefore, various measures for energy conservation have been taken throughout the world.

The air conditioner plays an important role in the summer for people living in the subtropical countries. Such an electric device is a power eater even though it brings forth comfort in the room during the summer. Statistically, the power consumption of the air conditioning systems occupies 30~40% of the peak load in the summer. Therefore, it has been an important issue to provide comfort in the living/working places with reduced power consumption.

In the prior art, such as Taiwan Pat. Pub. No. 200742819, there is disclosed a power saving device disposed in and electrically coupled to a temperature adjustment device. The power saving device comprises at least a temperature sensor, a processing unit and a switching unit. The temperature sensor issues a sensed signal of temperature to the processing unit, which generates a switching signal according to sensed signal. The switching unit switches a compressor to an operation state or a static state according to switching signal.

Moreover, Taiwan Pat. No. 175182 discloses a power control device for a centralized air conditioning system, using the outdoor temperature, the indoor temperature, the temperature of water flowing from/into the cooling tower and the pre-set temperature as control parameters to control the compressor, the cooling pump and the fan in the cooling tower of the air conditioning system according to a software program to provide comfort with reduced power consumption.

Moreover, U.S. Pat. No. 6,493,643 discloses a power control method capable of controlling the operation of electrical devices within a zone according to the detected total power consumption. This patent is useful in power saving management for home-use electrical devices. More particularly, the method uses a controller acquires real-time power consumption information of the electrical devices from the AC utility via internal communication devices to compare with a maximum value determined by a logical controller, time-of-use electricity tariff and the operation state of the electrical devices to generate a signal to the home-use plugs to control the power consumption. In this patent, the power consumption is compared with a standard value, which causes shed-load or reload of the system due to poor control accuracy.

SUMMARY OF THE INVENTION

It is one object of the present invention to provide a method for power load management, in which two standard values are determined to determine the timing for unloading/reloading of electrical devices according to a power consumption status and the relation between the two standard values so that the power consumption status is controlled to thus reduce power consumption.

It is another object of the present invention to provide a method and a system for power load management, in which the moving average for power consumption status in different time periods is compared to the two standard values so as to assure the control accuracy and the efficiency of the electrical devices.

It is another object of the present invention to provide a method and a system for power load management, in which a reload mechanism is further determined to reload the unloaded electrical device when the power consumption status or unload time is conformed to some conditions.

In one embodiment, the present invention provides a method for power load management, comprising steps of: determining a first standard value and a second standard value; determining a first monitoring value and a second monitoring value according to a power consumption status; determining whether the second monitoring value is larger than the second standard value when the first monitoring value exceeds the first standard value; and starting an unloading procedure if the second monitoring value is larger than the second standard value.

In another embodiment, the present invention further provides a system for power load management, comprising: a power meter, coupled to a power source to record a power consumption status; a control unit, electrically coupled to the power meter to issue an unloading signal or a reloading signal according to the power consumption status; and at least an electrical device, coupled the control unit to receive the unloading signal or the reloading signal to be unloaded or reloaded.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The present invention can be exemplified by the preferred embodiments as described hereinafter.

Figure 1:
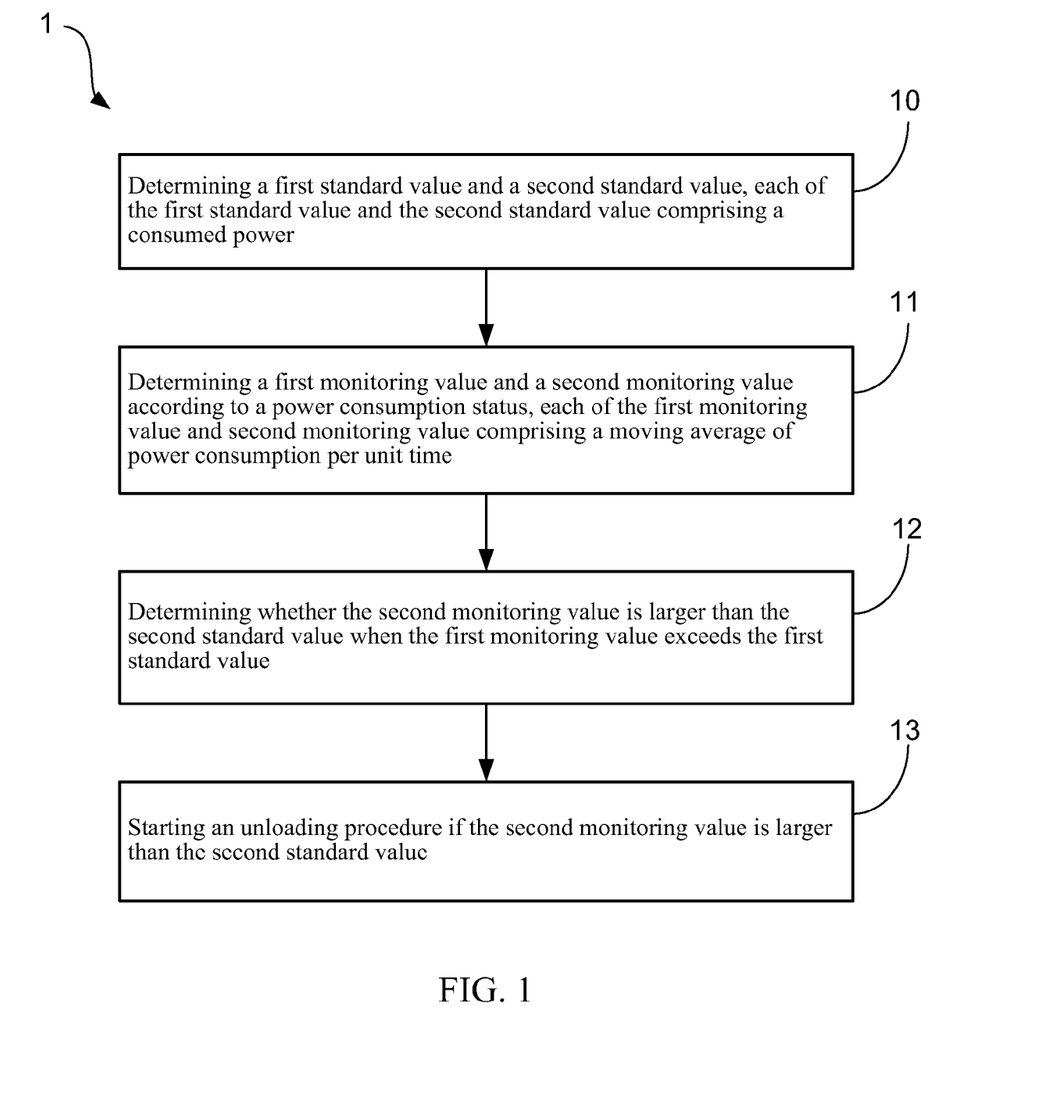
FIG. 1 is a flowchart of a method for power load management according to the present invention.
Figure 2:
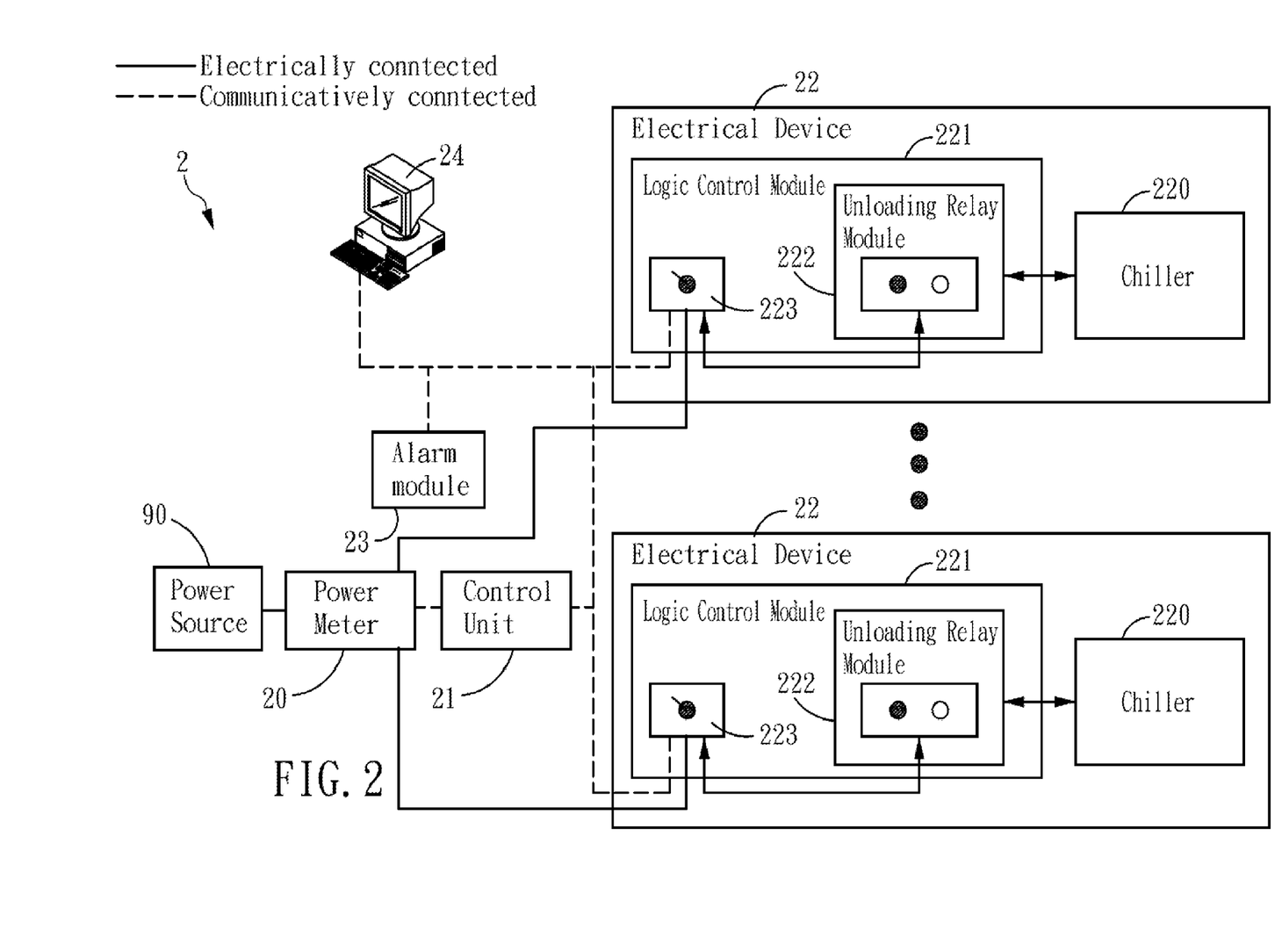
FIG. 2 is a schematic diagram of a system for power load management according to the present invention.

Please refer to FIG. 1, which is a flowchart of a method for power load management according to the present invention. The method 1 for power load management of the present invention is used in an electrical system such as an air-conditioning system in a building or a large zone. However, the present invention is not limited thereto. In the present invention, the timing for unload/reload is controlled so as to provide reliable electricity and meet the subscribers' requirement with reduced power consumption. In FIG. 2, the method 1 comprises steps as described. First, in Step 10, a first standard value and a second standard value are determined. In the present embodiment, the first standard value and the second standard value represent the consumed power (in kilowatt). The first standard value is smaller than the second standard value. The first standard value is determined by multiplying the second standard value with 90~98%. However, the present invention is not limited thereto. The second standard value is determined according to the contract capacity approved by the power providing company. However, the present invention is not limited thereto. The contract capacity is an upper limit of supplied power for each subscriber by power providing company. If this upper limit is exceeded, the subscriber will be fined by the power providing company. The power providing company calculates the upper limit based on the average consumed power per 15 minutes to be compared with the contract capacity. If the maximum average consumed power per 15 minutes exceeds the contract capacity, the subscriber has broken the contract.

Then, in Step 11, a first monitoring value and a second monitoring value are determined according to a power consumption status. The power consumption status is determined by a power meter disposed between the electrical system and the power providing company to indicate the consumed power by the electrical system. According to the power consumption status, the first monitoring value and the second monitoring value are determined. In the present embodiment, the first monitoring value and the second monitoring value indicate the continuous moving averages of the power consumption status. More particularly, the first monitoring value is the moving average per 12 minutes, while the second monitoring value is the moving average per 2 minutes. The period of the time for determining the average is determined according to practical uses and is not limited to the present embodiment. For example, in the present embodiment, since the power providing company calculates the exceeded power consumption according to the average consumed power per 15 minutes to be compared with the contract capacity, in the present embodiment, a first monitoring value is determined based on a period of time of 12 minutes, while a second monitoring value is determined based on a period of time of 2 minutes, resulting in a total of 14 minutes, which is shorter than the 15 minutes as a basis used by the power providing company, to achieve more precise control.

Figure 4:
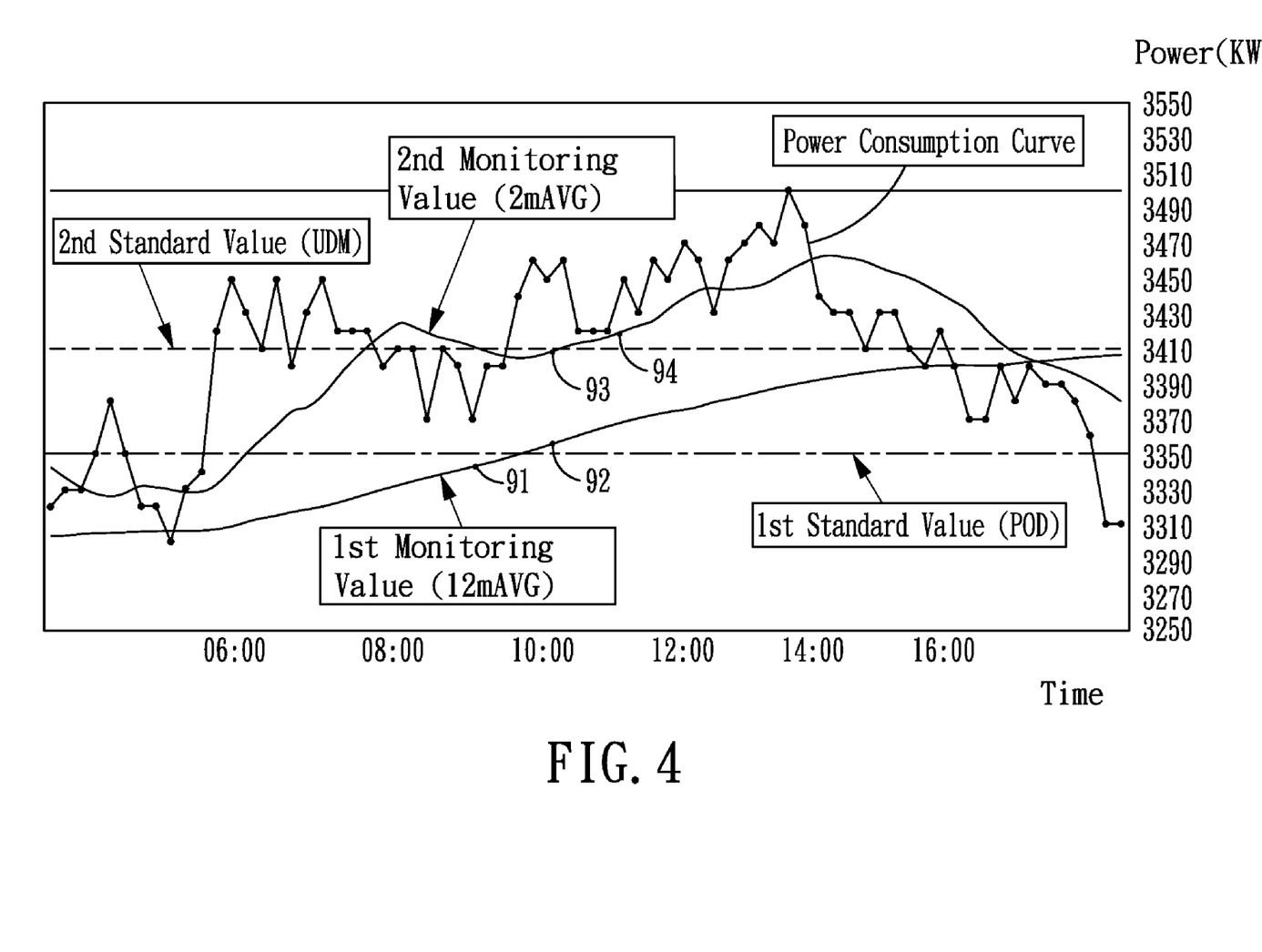
FIG. 4 is a graph showing a power consumption curve, a first monitoring value curve, a second monitoring value curve and the relation curve of a first standard value and a second standard value.

Then, in Step 12, whether the second monitoring value is larger than the second standard value when the first monitoring value exceeds the first standard value is determined. In Step 12, a two-stage monitoring procedure using the first standard value and the second standard value is used. If the first monitoring value exceeds the first standard value, the relation between the second monitoring value and the second standard value is determined. Since the first monitoring value is the moving average per 12 minutes, the slope of the first monitoring value curve is smaller, as shown in FIG. 4, to avoid mis-determination. If the moving average per 12 minutes exceeds the first standard value, a power consumption peak is going to appear. Therefore, a second monitoring value (i.e., the moving average per 2 minutes) is used to intensively monitor the power consumption status. If the second monitoring value is larger than the second standard value, Step 13 is performed to start an unloading procedure.

Please refer to FIG. 2, which is a schematic diagram of a system for power load management according to the present invention. The system 2 comprises a power meter 20, a control unit 21 and at least an electrical device 22. The power meter 20 is electrically coupled to a power source 90. The power meter 20 is capable of recording real-time power consumption status per unit time. In the present embodiment, the power source 90 is a substation for providing electricity. The control unit 21 is communicatively coupled to the power meter 20. The control unit 21 is electrically coupled to the power meter 20 to issue an unloading signal or a reloading signal according to the power consumption status recorded in the power meter 20. Communicatively coupling is achieved via a wired network or a wireless network using TCP/IP protocol for information transmission. The control unit 21 is a device with arithmetic ability such as a programmable logic controller (PLC) control unit a computer or a workstation. In the present embodiment, to stabilize the system, the control unit 21 is a PLC control unit.

The electrical device 22 is communicatively coupled to the control unit 21 to receive the unloading signal or the reloading signal to be unloaded or reloaded. In the present embodiment, the electrical device 22 is exemplified by, but not limited to, an air-conditioning device, which can be installed in a building, a community or a public place. Moreover, the control unit 21 is communicatively coupled to an information display unit 24 as a user's interface such as a workstation or a server, whereon software is installed to monitor the operation status, power consumption status and related settings of the system in FIG. 2. Certainly, all the information is transmitted to the control unit 21 as a basis for operation.

In FIG. 2, the power meter 20 is capable of recording the total consumed power of the electrical devices such as air conditioners installed in the monitored region including buildings, communities or public places. Then, the control unit 21 is capable of determining whether the electrical device is to be unloaded or reloaded according to the real-time recorded power consumption and the flowchart in FIG. 1.

Figure 3:
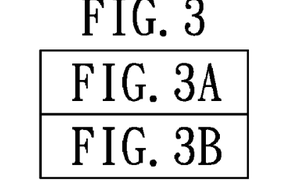
FIG. 3A and FIG. 3B show a flowchart of an unloading procedure according to the present invention.
Figure 3A:
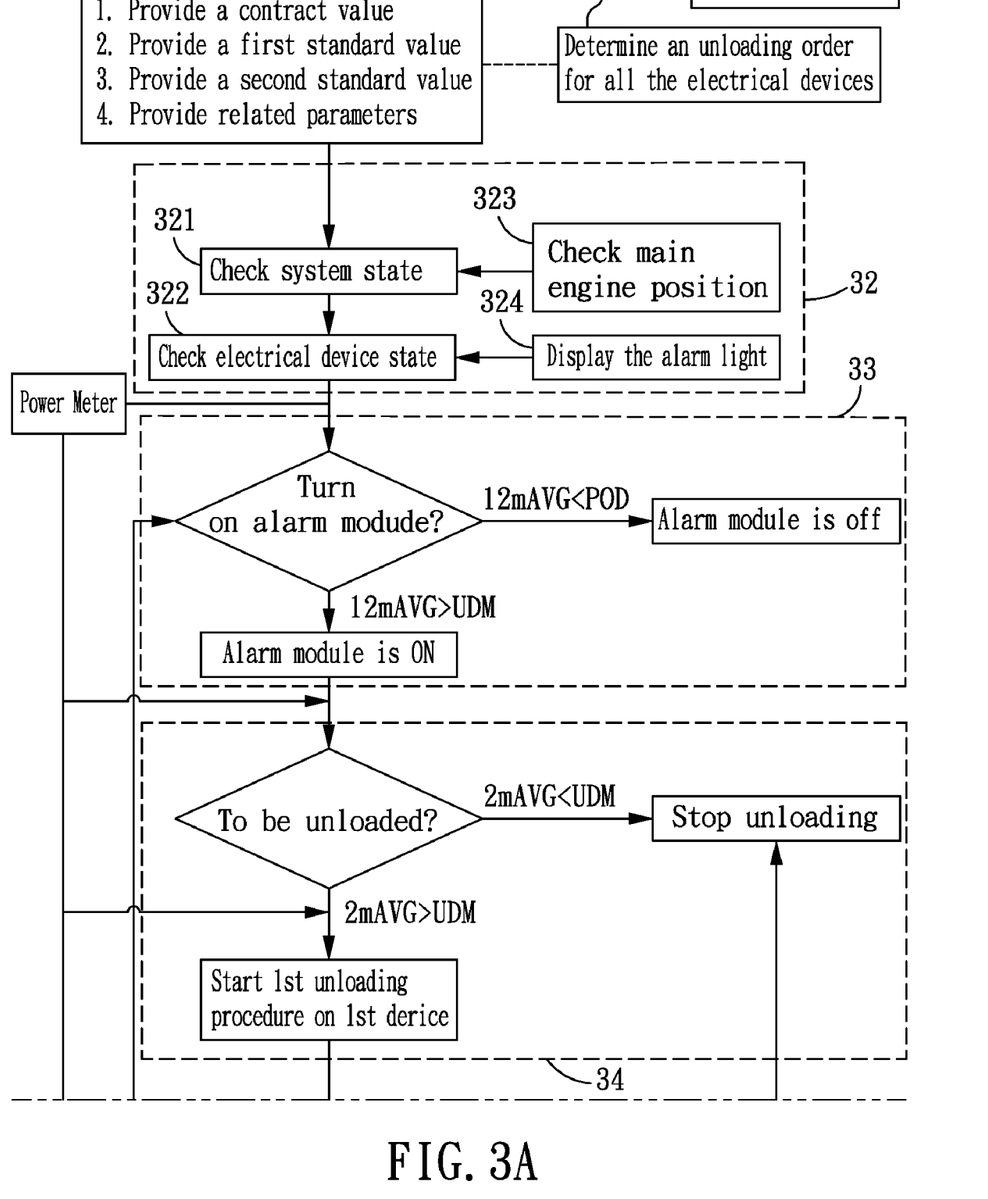
Figure 3B:
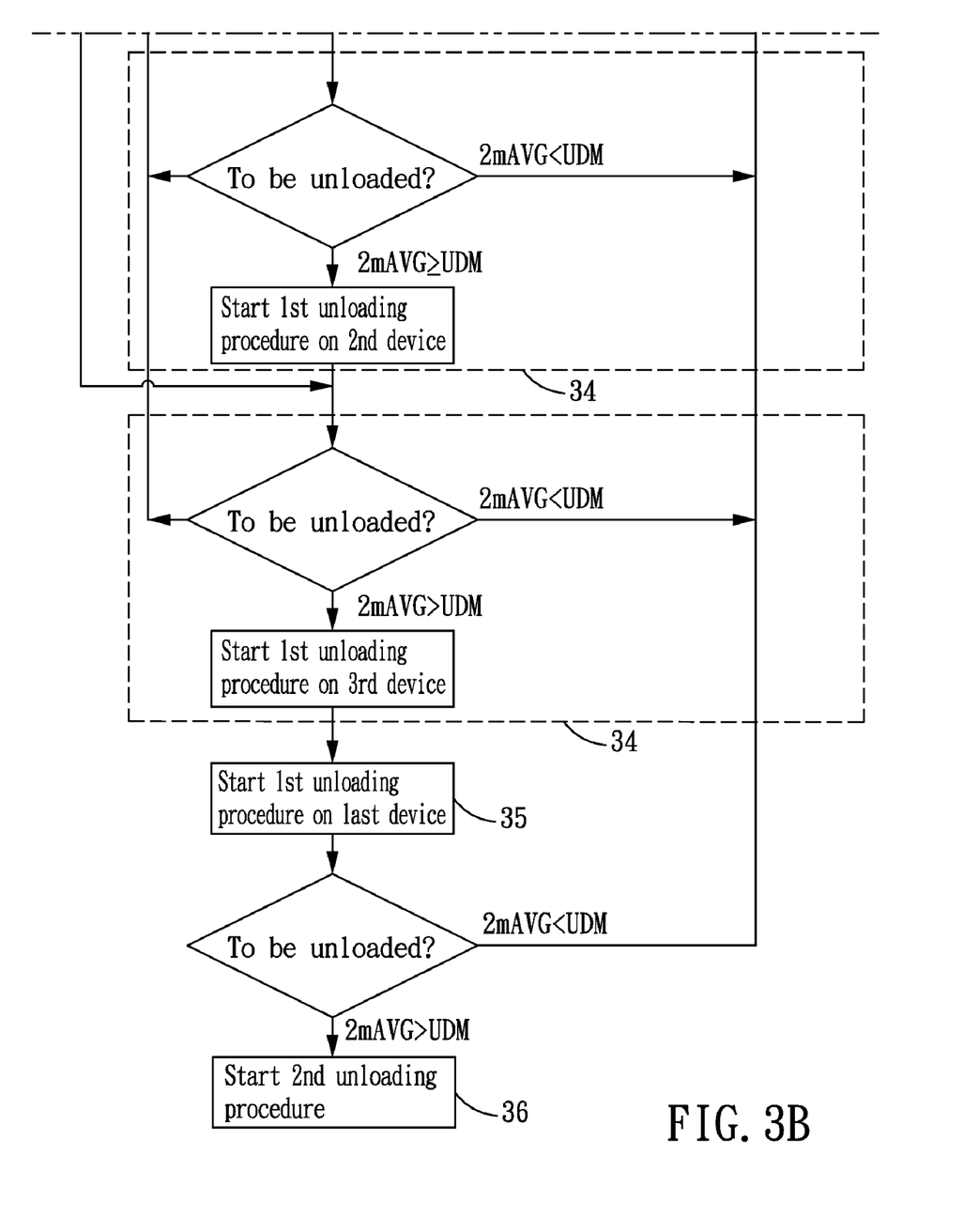

Please refer to FIG. 3A and FIG. 3B for a flowchart of an unloading procedure according to the present invention. The system in FIG. 2 is exemplified to describe the flowchart of the method 3 in FIG. 3A and FIG. 3B. First, in Step 30, an unloading order is determined for all the electrical devices. In this step, an electrical device that is not to be unloaded for the time being is selected according to practical use. Since the method of the present invention is capable of monitoring the power consumption of electrical devices in a large area, an unloading order is required to be pre-determined as a basis for the unloading procedure because the number of electrical devices may be to large in such a large area. Certainly, the present invention is not limited to the present embodiment. In Step 31, a contract value, a first standard value, a second standard value and related parameters are provided. Then, in Step 32, the status of the system is confirmed. In the present step, Step 321 to Step 324 describe that the electrical devices 22 and the control unit 21 operate in a communication state, starting or off state, automatic mode or local mode. The automatic mode indicates that the electrical device 22 receives the unloading or reloading command from the control unit 21, while the local mode indicates that the electrical device 22 is no longer controlled by the control unit 21 to stop receiving any unloading or reloading command. Usually, when special events happen, it is required to stop unloading the electrical device for the time being.

Then in Step 33, referring to FIG. 4, the moving average per 12 minutes of the power consumption status obtained according to the power consumption (KW) per unit time recorded by the power meter 20 as a first monitoring value (12 mAVG) is compared to the first standard value (POD). If the first monitoring value (12 mAVG) is smaller than or equal to the first standard value (POD) at Point 91 in FIG. 4, the power consumption still has not exceeded the contract value and thus the alarm module 23 is off. When the first monitoring value (12 mAVG) is larger than the first standard value (POD)

at Point 92 in FIG. 4, the power consumption is likely to exceed the contract value and thus the alarm module 23 is turned on to inform the monitoring staff. As the alarm module 23 is turned on, Step 34 is performed to determine whether the electrical device is to be unloaded. In the present step, instead of comparing the first monitoring value and the first standard value, a second monitoring value (2 mAVG) (i.e., the moving average per 2 minutes of the power consumption status) and a second standard value (UDM) are compared. If the second monitoring value (2 mAVG) is smaller than the second standard value (UDM) at Point 93 in FIG. 4, the current power consumption has not exceeded the contract value and thus the unloading procedure is not performed. On the contrary, if the second monitoring value (2 mAVG) is larger than the second standard value (UDM) at Point 94 in FIG. 4, the power consumption is likely to exceed the contract value and thus a first unloading procedure is performed.

The unloading order of electrical devices in the first unloading procedure is according to Step 30. In the first unloading procedure, the loading capability of the main engine is reduced by a specific percentage, for example, 20% in the present embodiment. The percentage of loading capability reduced is determined according to practical uses and is not limited to 20% as in the present embodiment. Therefore, after the first unloading procedure, the maximum loading capability is 80% left. Repeating Step 34, if the second monitoring value (2 mAVG) of the power consumption is larger than the second standard value (UDM) after the electrical device is unloaded, a second electrical device is to be unloaded according to the unloading order. The relation between the second monitoring value and the second standard value is repeatedly monitored until all the electrical devices 22 have been unloaded. In the present embodiment, it takes 2 minutes to determine whether any electrical device is to be unloaded. However, the present invention is not limited to 2 minutes as in the present embodiment.

In Step 35, after all the electrical devices 22 have been unloaded, Step 36 is performed to start a second unloading procedure if the second monitoring value (2 mAVG) is still larger than the second standard value (UDM). The unloading order of electrical devices in the second unloading procedure is according to Step 30. The second unloading procedure is similar to that in Step 33 except that the loading capability of the electrical device is reduced by 20% more in the second unloading procedure. Therefore, after the first and second unloading procedures, the maximum loading capability is 60% left. The number of unloading procedures and the reduction percentage are determined according to practical uses and the present invention is not limited thereto.

Figure 5:
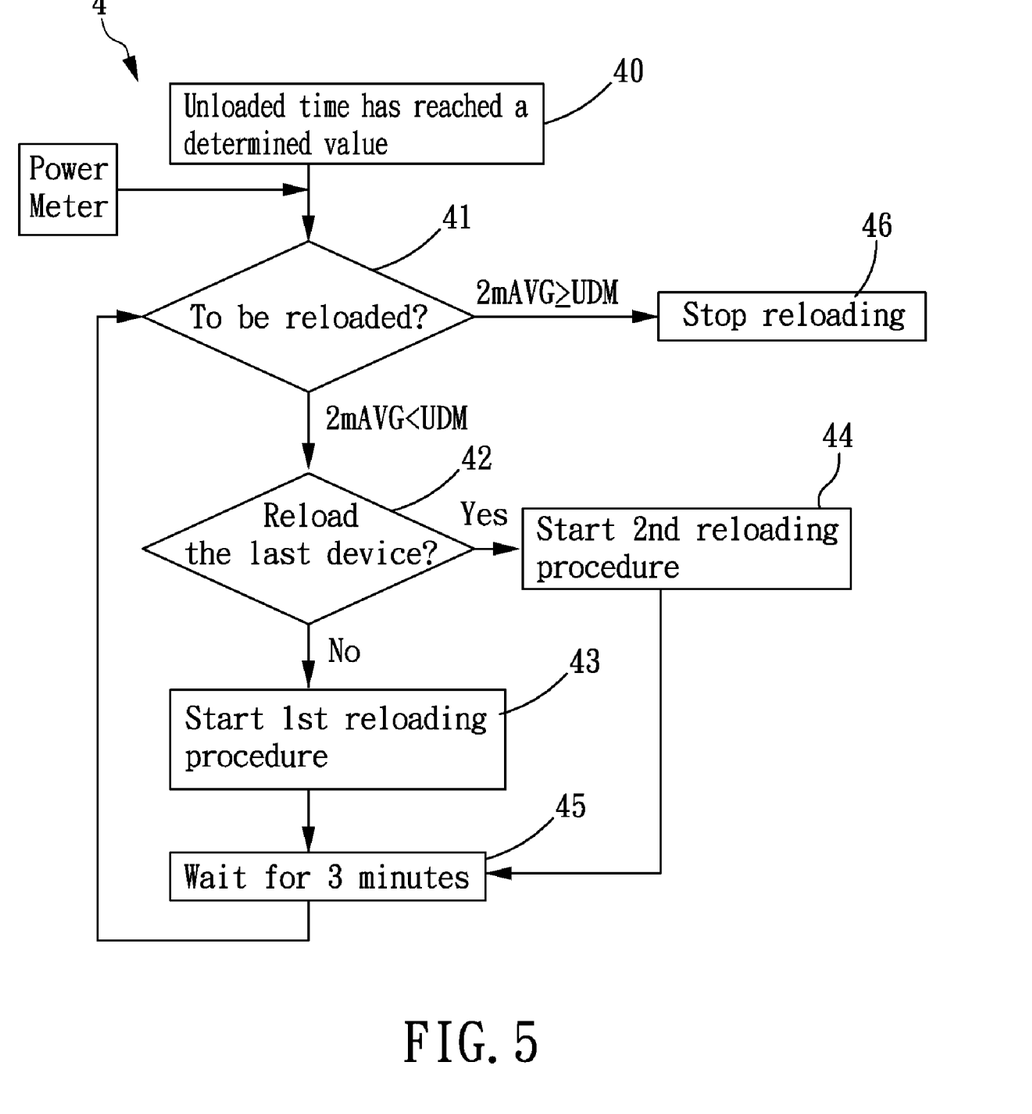
FIG. 5 is a flowchart of a reloading procedure according to the present invention.

Please refer to FIG. 2 and FIG. 5, wherein FIG. 5 is a flowchart of a reloading procedure according to the present invention. In the present embodiment, the timing for the unloaded electrical devices to be reloaded is determined. When there is an unloaded electrical device 22, the control unit 21 monitors the unloaded time of the unloaded electrical device for maintaining suitable room temperature. The unloaded time is monitored in Step 40 to determine whether it has reached a pre-determined value, for example, 30 minutes in the present embodiment. Moreover, each of the electrical devices is provided with an optimal reloaded time according to its temperature condition to achieve the best result. Step 41 is performed when the reloaded time comes to determine whether a reloading procedure is to be performed according to the comparison of the second monitoring value (the average value per 2 minutes) and the second standard value. If the second monitoring value (2 mAVG) is smaller than the second standard value (UDM), the power consumption is reduced. Meanwhile, Step 42 is performed to determine whether the reloaded electrical device is the last one. If not, Step 43 is performed to start a first reloading procedure to increase the maximum loading from 60% to 80%. On the contrary, if the reloaded electrical device is the last one, a second reloading procedure is started in Step 44 because the first reloading procedure has been performed on all the devices, resulting in an increase of maximum loading from 80% to 100%.

Returning to Step 43, after the first electrical device 22 is reloaded, there is a waiting time, for example, 3 minutes in the present embodiment. The second monitoring value and the second standard value are compared to determine whether a next electrical device is to be reloaded. In Step 41, if the second monitoring value (2 mAVG) is larger than the second standard value (UDM), the power consumption of the system is high and thus the device is not to be reloaded.

Returning to FIG. 2, the electrical device 22 further comprises a chiller 220 and a logic control module 221. The chiller 220, in the present embodiment, is exemplified by, but not limited to, an air conditioner. The logic control module 221 is capable of receiving the unloading signal or the reloading signal to issue an operation signal to the chiller 220. The logic control module 221 further comprises an unloading relay module 222 and a logic control unit 223. The unloading relay module 222 is electrically coupled to the chiller 220. The unloading relay module 222 is capable of transmitting the operation signal to the chiller 220. The logic control unit 223 is electrically coupled to the unloading relay module 222. The logic control unit 223 controls the unloading relay module 222 according to the unloading signal or the reloading signal.

Figure 6:
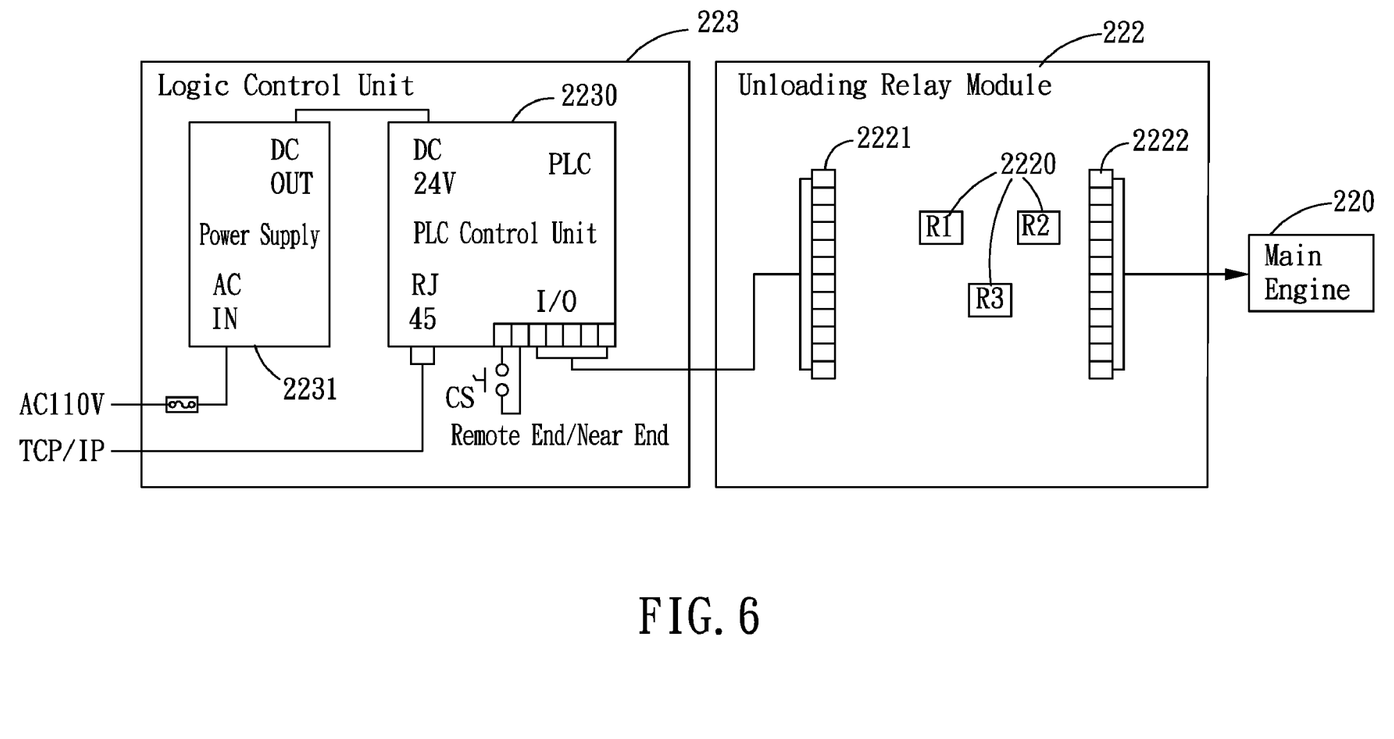
FIG. 6 is a schematic diagram of a logic control module according to the present invention.

As shown in FIG. 6, which is a schematic diagram of a logic control module according to the present invention, the unloading relay module 222 comprises a plurality of relays 2220 and two crimping machines 2221 and 2222. One crimping machine 2222 is electrically coupled to the plurality of relays 2220 and the chiller 220, while the other crimping machine 2221 is electrically coupled to the plurality of relays 2220 and the logic control unit 223. The logic control unit 223 further comprises a PLC control unit 2230 and a power supply 2231. The PLC control unit 2230 is electrically coupled to the crimping machine 2221 in the unloading relay module 222 and the control unit 21 to transmit the main engine status via network communication.

Please refer to Table 1, Table 2 and Table 3. Table 1 shows a comparison of consumed power in kilowatt-hours. Table 2 shows comparison of fines. Table 3 shows saved electricity fees (Compared to the year of 2004). It is observed that the method of the present invention does not only reduce the consumed power but also make electricity fees less. On the other hand, the unload/reload determination mechanism of the present invention further reduces the fine. For example, according to Table 1 to Table 3, for Industrial Technology Research Institute (ITRI), the consumed power and the fine in 2007 are much lower than those in 2004. Therefore, the method of the present invention helps Industrial Technology Research Institute (ITRI) to save plenty of money, as shown in Table 3.

TABLE 1

Comparison of consumed power in kilowatt-hours

| | Campus | | | | | |
|---|---|---|---|---|---|---|
| | Chong-Hsin Campus | | Kwang-Fu Campus | | Total | |
| Year | Kilowatt-Hour | Compared to Year 2004 | Kilowatt-Hour | Compared to Year 2004 | Kilowatt-Hour | Compared to Year 2004 |
| 2004 | 105,048,000 | 0 | 19,500,000 | 0 | 124,548,000 | |
| 2007 | 101,395,000 | 3,653,000 | 18,956,000 | 544,000 | 120,351,000 | 4,197,000 |

TABLE 2

Comparison of Fines

| | Campus | | | | | | |
|---|---|---|---|---|---|---|---|
| | Chong-Hsin Campus | | Kwang-Fu Campus | | Total | | |
| Year | Thousand NT Dollars | Compared to Year | Thousand NT Dollars | Compared to Year 2004 | Thousand NT Dollars | Compared to Year 2004 | Percentage (%) |
| 2004 | 4,424 | 0 | 1,716 | 0 | 6,140 | 0 | 0 |
| 2007 | 917 | −3,507 | 1,009 | −708 | 1,925 | −4,215 | −68.6 |

TABLE 3

Saved Electricity Fees (Compared to the year of 2004)

| | Campus | | | | | | |
|---|---|---|---|---|---|---|---|
| | Chong-Hsin Campus | | | Kwang-Fu Campus | | | |
| Year | Saved Moving Electricity Fees (Thousand NT Dollars) | Saved Fine (Thousand NT Dollars) | Total | Saved Moving Electricity Fees (Thousand NT Dollars) | Saved Fine (Thousand NT Dollars) | Total | Total Total Saved Fee (Thousand NT Dollars) |
| 2007 | −7671 | −3,507 | −11,178 | −1,142 | −708 | −1,850 | −13,029 |

Accordingly, the present invention discloses a method and a system for power load management, in which two standard values are determined to determine the timing for unloading/reloading of electrical devices according to a power consumption status and the relation between the two standard values so that the power consumption status is controlled to thus reduce power consumption. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A system for power load management, comprising:
    a power meter, coupled to a power source to record a power consumption status;
    a control unit, communicatively coupled to the power meter for determining unloading and reloading by using a first standard value and a second standard value different from the first standard value, and a first monitoring value and a second monitoring value corresponding to the first standard value and the second standard value, respectively, so as to issue an unloading signal or a reloading signal, wherein each of the first standard value and the second standard value comprises a consumed power limit determined according to a contract capacity, and wherein the first monitoring value comprises a continuously moving average of current power consumption per a first period of time, and the second monitoring value comprises a continuously moving average of the current power consumption per a second period of time, and wherein the durations of the first period of time and the second period of time are at least ten minutes different from one another;
    at least an electrical device, coupled the control unit to receive the unloading signal or the reloading signal to be unloaded or reloaded; and
    an alarm module communicatively coupled to the electrical device and the control unit, configured such that
        when the first monitoring value is smaller than or equal to the first standard value, the alarm module is off; and
        when the first monitoring value is larger than the first standard value, the alarm module is turned on to alert a monitoring staff that the current power consumption has exceeded a predetermined level, wherein when the second monitoring value is smaller than the second standard value, no unloading procedure is performed, and wherein when the second monitoring value is larger than the second standard value, a first unloading procedure is performed.

2. The system for power load management as recited in claim 1, wherein the electrical device comprises:
   a chiller; and
   a logic control module, capable of receiving the unloading signal or the reloading signal to issue an operation signal to the chiller.

3. The system for power load management as recited in claim 2, wherein the chiller is an air conditioner.

4. The system for power load management as recited in claim 2, wherein the logic control module comprises:
   an unloading relay module, electrically coupled to the chiller, the unloading relay module being capable of transmitting the operation signal to the chiller; and
   a logic control unit, coupled to the unloading relay module, the logic control unit being capable of controlling the unloading relay module according to the unloading signal or the reloading signal.

5. The system for power load management as recited in claim 4, wherein the unloading relay module further comprises a plurality of relays.

6. The system for power load management as recited in claim 4, wherein the logic control unit is capable of switching between an automatic mode and a local mode.

7. The system for power load management as recited in claim 4, wherein the control unit is further connected to an information display unit.

8. The system for power load management as recited in claim 4, wherein the logic control unit further comprises a power supply and an arithmetic unit.

9. The system for power load management as recited in claim 1, wherein the control unit communicates with the at least an electrical device and the power meter via a wired network or a wireless network.

* * * * *